March 3, 1936.　　　S. H. ATTWOOD　　　2,032,828
FILTER FOR LIQUIDS
Filed Jan. 31, 1934
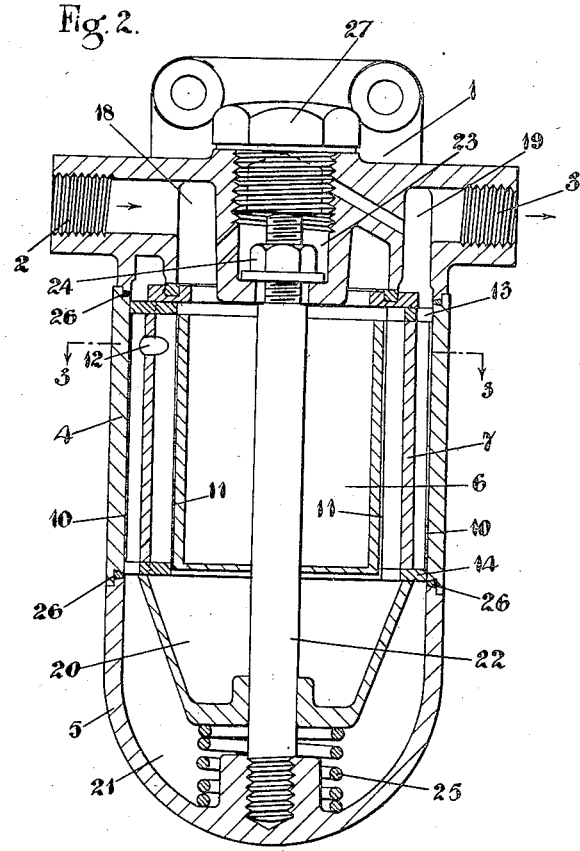
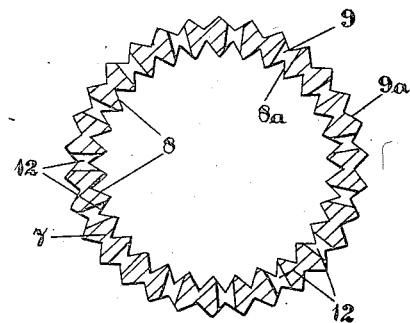
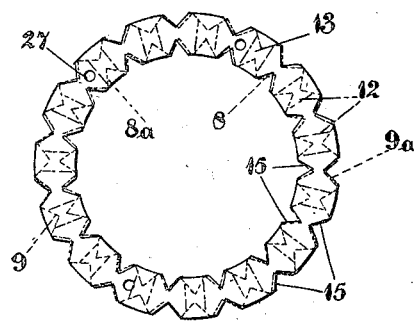
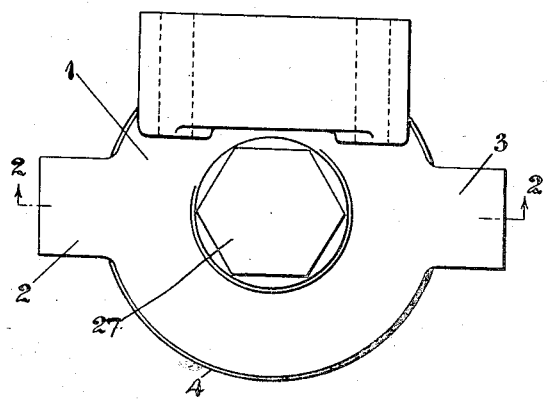
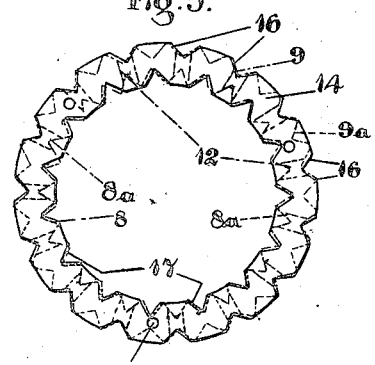
Stanley H. Attwood INVENTOR.
By Smith, Michael & Gardiner, Attorneys Patented Mar. 3, 1936

2,032,828

UNITED STATES PATENT OFFICE 2,032,828

FILTER FOR LIQUIDS

Stanley Herbert Attwood, New Malden, England

Application January 31, 1934, Serial No. 709,225
In Great Britain February 7, 1933

13 Claims. (Cl. 210—165)

This invention relates to improvements in filters for liquids and to that type of filter in which the filtering effect is obtained by the passage of the liquid to be filtered from one passage to another through a relatively narrow space or spaces provided between the edges or surfaces of adjacently arranged elements, which, for example, can be made separately and assembled together.

The principal object of the invention is to provide a filter of the above type which is self-cleaning. A further object is to provide such a self-cleaning filter which is of a simple construction which renders the manufacture thereof a more economical proposition than has been the case with filters of the type referred to as hitherto constructed.

Yet a further object of the invention is to provide such a filter wherein a plurality of filtering spaces are provided which may be of different gauge so as to constitute a filter of a corresponding number of stages.

As will be apparent hereinafter, it is a feature of the filter provided according to the present invention that the narrow filtering spaces are so arranged that upon the entry side of the said spaces the liquid to be filtered is caused to flow in a direction which tends to convey particles of dirt restrained at the entrance to the said spaces downwardly towards a sump or other receptacle.

By this means the flow of the liquid dislodges particles of dirt restrained at the entrance to the narrow filtering spaces and conveys them, assisted by the settling of the particles under the influence of gravity, to the dirt receiving sump.

In order that the invention may be fully understood, reference is directed to the accompanying drawing, in which:—

Figure 1 is a plan of a filter constructed in accordance with the invention;

Figure 2 is a vertical section of the filter on the line 2—2 of Figure 1, but drawn to a larger scale than the latter figure;

Figure 3 is a section on the line 3—3 of Figure 2; and

Figures 4 and 5 show respectively in plan, upper and lower notched sealing rings for a grooved sleeve forming part of the filter and hereinafter described, the grooves of the sleeve being shown in dash lines on the rings.

Referring to the drawing, the filter comprises a head 1 provided with inlet and outlet openings 2, 3 for the liquid to be filtered, an outer cylindrical casing 4 secured to and arranged below the head element and which houses the filtering elements through which the liquid flows from the aforesaid inlet to the outlet, and a sump member 5 secured to the lower end of the cylindrical casing 4 for the purpose of collecting dirt filtered from the liquid.

Within the outer cylindrical casing 4 an inner cylindrical core 6 is provided co-axial therewith and spaced therefrom, the lower end of the core being closed. Between the casing 4 and the core 6 a sleeve 7 is located which is provided internally and externally with a series of axially disposed V section grooves; the grooves of the inner series are alternately designated 8 and 8a whilst those of the outer series are alternately designated 9 and 9a. The inner series of grooves are aligned with those of the outer series in the radial direction of the sleeve. The partition walls between adjacent grooves are relatively narrow at the apices and may even be brought to a knife edge, the outer and inner diameters of the sleeve being such that at the ends the said sleeve is a contact fit within the outer casing 4 and around the cylindrical core 6. The apices of the partition walls are reduced for the greater portion of their length between their ends by an amount corresponding to the width of the narrow filtering spaces required; for example, the reduction in height of the inner partition walls may be .005 inch and the reduction of the outer partition walls may be .002 inch in order to provide a two-stage filter in a manner hereinafter described. In the drawing, the clearances between the apices of the partition walls and the core and the casing have been exaggerated for the sake of clearness and the spaces are indicated at 10 and 11.

Adjacent to its upper end the sleeve is pierced with holes 12 to establish communication between the respective alternate series of grooves 8a and 9 and the upper and lower ends of the sleeve are provided with notched sealing rings 13, 14 shown respectively in Figures 4 and 5, the said rings being such that the inner and outer grooves 8a and 9 arranged in communication with one another by the holes 12 are sealed at the top by the ring 13, the other grooves 8 and 9a remaining open at the top through the notches 15 in the ring 13, whilst at the bottom of the grooves, those grooves 9 of the outer series associated with the holes 12 are open through notches 16 in the ring 14 and the other grooves 9a of the outer series closed and those 8a of the inner series of grooves associated with the holes 12 are closed by the ring 14 and the others 8 of the inner series open through notches 17 in the ring 14. The head element 1 is provided with two annular recesses 18, 19, the inner one 18 of which is arranged in communication with the inlet opening 2 in the head and is arranged to communicate solely with the upper ends of the grooves 8 of the inner series which are open at the top, whilst the outer annular recess 19 is arranged in communication with the outlet 3 in the head of the filter and is arranged to communicate solely with the upper ends of the grooves 9a of the outer series which are open at the top. Two members 20 and 21 are provided to form the sump 5 which may conveniently be hemispherical in shape and concentrically disposed relatively to one another, the inner one 20 of which communicates solely with the open ended grooves 8 of the inner series and seals the same from the lower open ends of the grooves 9 of the outer series with which the outer sump 21 alone communicates.

The various members of the filter as above described are held together when assembled, by a bolt 22 extending from the lower outermost sump member 21 through the central core 6 and into a recess 23 provided in the head 1 where a nut 24 is screwed on to the bolt. A spring 25 is interposed between the two sumps to maintain the inner one in position. The recess 23 is covered by a cap 27 screwed into the recess. The various members are maintained in liquid tight sealing contact with one another by the interposition of packing washers 26.

In operation, the liquid to be filtered is supplied to the inlet 2 of the filter either under a few pounds pressure or under the influence of gravity or by virtue of suction applied at the outlet 3. The liquid flows into the inner annular recess 18 in the head and thence into the alternate grooves 8 of the inner series which are open at the top and bottom. The liquid fills the said grooves and the inner sump 20 and flows across the narrow spaces provided at the apices of the partition walls on either side of the grooves and into the grooves 8a. Any particles of dirt of a size in excess of the width of the filtering space are restrained at the edges of the apices of the walls upon the entry side of the said spaces, that is, in the grooves 8, and it is to be noted that the flow of the liquid down the inner grooves 8 tends to convey the particles restrained at the entrance to the filtering spaces, in a downward direction towards the inner sump 20 into which the particles ultimately settle under the influence of gravity. The liquid which flows into the grooves 8a on either side of the grooves 8, fills the grooves 8a which are closed at the top and bottom and passes through the holes 12 pierced in the sleeve into the upper ends of the grooves 9 of the outer series which become filled with the liquid by a downward flow thereof; the grooves 9 of the outer series being open at the bottom cause the liquid to fill the outer sump 21. The liquid passes through the narrow filtering spaces at the apices of the partition walls of the outer grooves and into the other set 9a of the outer grooves which are closed at the bottom, and thence the liquid flows out at the open upper ends of the grooves 9a into the outer annular recess 19 in the head 1 and out of the outlet opening 3. During the passage of the liquid through the narrow filtering spaces at the apices of the outer partition walls between the outer grooves, particles of dirt are restrained at the edges of the apices upon the entry side of the filtering spaces, that is, in the grooves 9, in a similar manner to that effected by the apices of the inner partition walls as above described and it will be noted that in this instance also the flow of the liquid from the holes 12 provided in the sleeve in a downward direction tends to convey the particles of dirt so restrained, in a downward direction, the particles ultimately settling under the influence of gravity in the outer sump 21.

It has definitely been proved by trial that the downward flow of the liquid upon the entrance side of the narrow filtering spaces effects a dislodgment of the filtered particles from the edges of the partition walls and the filter is thus rendered self-cleaning, whereas, if the liquid flows in an upward direction upon the entry side to the filtering spaces the dirt accumulates until the filter becomes blocked. Also if the liquid flows downwardly upon the entry side of the filtering spaces in grooves which are closed at the bottom, an accumulation of dirt occurs in the bottom of the grooves and also results in the ultimate blocking of the filter.

When a filter constructed in accordance with the invention is employed for filtering the fuel oil supplied to a Diesel type of engine on a road vehicle, the fixing of the filter, for example, upon the dashboard of the vehicle causes the self-cleaning propensities of the filter to be enhanced due to the vibration of the vehicle, the settling of the dirt into the collecting sumps being accelerated.

Moreover, when the liquid is passed through the filter by virtue of suction applied at the outlet 3 thereof and the liquid is drawn from a tank located a short distance below the filter, a very slight reactive movement of the liquid in the opposite direction to the normal occurs when the flow of liquid is cut off, and this reaction is found to assist the dislodgment of the filtered dirt from the edges of the partition walls above described.

The sumps 20, 21 of the filter as above described can be readily cleaned, by unfastening the nut 24 of the securing bolt after removing the cap 27, and removing the sumps; at the same time the cylindrical casing 4, sleeve 7 and core 6 can be readily removed for inspection and the fineness of the filter can easily be varied by the insertion of another grooved sleeve such as 7 having different clearances at the apices of the partition walls of the grooves, thus altering the width of the narrow filtering spaces of the filter.

In the construction of filter as herein described, the grooved sleeve 7 can readily be formed by a portion of an extruded metal tube of the desired cross-section, thus reducing costs of manufacture and in lieu of reducing the apices of the partition walls of the grooves for a portion of their length, the inner and outer diameters of the sleeve can be formed respectively greater and smaller than the outer diameter of the core 6 and the inner diameter of the cylindrical casing 2 for the entire length of the sleeve and the sleeve located relatively to the core and casing to provide the filtering spaces by distance members such as the notched sealing rings 13, 14 hereinbefore described, which are preferably pinned or otherwise secured to the ends of the sleeve. In the drawing the rings 13, 14 are pinned to the sleeve 7 as shown at 27.

It will, of course, be understood that the filter may comprise one stage only or more than two stages such as is herein described by way of a specific example only. If the above described filter is used for one stage filtering for both series of grooves, then only the outer sump 20 is necessary.

The grooved sleeve can also be formed by moulding from a synthetic resin or like material, in which case the grooves can be formed closed at the appropriate ends by the moulded material.

It is not essential for the inlet and outlet connections of the filter to be located at the top of the filter or for both to be located at the same end as one another.

It will be appreciated that in all cases it is necessary for the partition walls between adjacent cavities formed by the grooves in the sleeve to be substantially vertical.

It is to be understood that the invention is not limited to the specific examples described herein but that various changes may be made within the scope of the appended claims.

What I claim and desire to secure by Letters Patent of the United States is:—

1. A filter for liquids which comprises, in combination, a member having at least two elongated passages therein, an inlet for liquid towards one end of one of said passages and a dirt collecting sump connected to the other end of said one passage so that liquid supplied to said one passage from said inlet can flow therein only in the direction from said inlet towards said sump, an outlet for liquid from the other of said passages, and a partition wall between said passages penetrated by at least one narrow elongated filtering space effecting communication between said passages, said filtering space extending lengthwise of said partition wall in a direction parallel to the elongation of said passages and between said inlet to said one passage and said dirt collecting sump so that liquid flowing in said one passage in the direction from said inlet to said sump flows in the same direction to reach all parts of said filtering space.

2. A filter for liquids which comprises in combination an element having a series of vertically disposed elongated passages formed therein in side-by-side relationship with one another, substantially vertical partition walls between adjacent passages and each wall having a narrow substantially vertical slot formed therethrough to constitute a filtering space and serving as a means of communication between adjacent passages, an inlet for the liquid leading to the upper ends of one set of alternate passages the lower ends of which are open, a dirt collecting sump arranged in communication with said lower open ends and an outlet for the liquid from the other set of alternate passages, said other set of alternate passages being closed from communication with said sump.

3. A filter for liquids which comprises in combination an element having at least two parallel grooves formed therein which are substantially parallel to the vertical axis of the filter and are separated from one another by a partition wall, a member applied against said element to close said grooves in the lateral direction, the partition wall being spaced from said member to form a narrow elongated filtering space constituting a connecting passage between the two grooves, an inlet for the liquid leading to the upper end of one of the grooves the lower end of which is open, a dirt collecting sump arranged in communication with the said lower open end of said groove and an outlet for the liquid from the other groove.

4. A filter for liquid which comprises in combination a member having a cylindrical surface of which the axis is arranged vertically of the filter, a series of adjacently disposed grooves formed in the axial direction of said member in said surface, partition walls separating the adjacent grooves from one another, a cylinder applied to said member to close the grooves in the lateral direction thereof, the partition walls being separated from said cylinder intermediately of the ends of said member by a distance such as to form elongated filtering spaces between said walls and said cylinder, said spaces constituting connecting passages between adjacent grooves, an inlet for the liquid leading to the upper ends of one set of alternate grooves, the bottom ends of which are open, a dirt collecting sump arranged in communication with said lower open ends of said set of grooves and an outlet for the liquid from the other set of alternate grooves.

5. A filter for liquids comprising, in combination, a member having a plurality of cavities therein, an inlet for liquid to one end of one of said cavities, the other end of said one cavity being open, a partition wall between the said one cavity and a second of said cavities, said partition wall being penetrated by a narrow elongated filtering space constituting a connecting passage between the two said cavities, a passage connecting the second of said two cavities to a third cavity, a partition wall between said third cavity and a fourth cavity also penetrated by a narrow elongated filtering space constituting a connecting passage between said third and fourth cavities, an outlet for liquid from said fourth cavity and a dirt collecting sump arranged in communication with the open end of said first cavity.

6. A filter for liquids comprising, in combination, a member having a plurality of cavities therein, an inlet for liquid to one end of one of said cavities, the other end of said one cavity being open, a partition wall between the said one cavity and a second of said cavities, said partition wall being penetrated by a narrow elongated filtering space constituting a connecting passage between the two said cavities, a passage connecting the second of said two cavities to a third cavity having an open end, a partition wall between said third cavity and a fourth cavity penetrated by a narrow elongated filtering space constituting a connecting passage between said third and fourth cavities of different gauge to said filtering space connecting said first and second cavities, an outlet for liquid from the fourth cavity and a pair of dirt collecting sumps one arranged in communication with the open end of said first cavity and the other arranged in communication with the open end of said third cavity to collect dirt therefrom.

7. A filter for liquids comprising, in combination, an inlet to said filter and an outlet therefrom, a filtering element comprising a member having a plurality of elongated passages formed in one side thereof and a plurality of further elongated passages formed in the other side thereof, said passages on opposite sides of said member being aligned axially and corresponding alternate ones of said passages on the two sides of said member being in communication with one another, a partition wall between each pair of passages on the two sides of said member, each of said partition walls being penetrated by at least one narrow opening elongated in the same direction as said passages and constituting a filtering space establishing communication between the passages on the same side of said member, a dirt collecting sump, means connecting one end of the alternate ones of said passages on one side of said member which are not in communication with the corresponding passages on the other side of said member with said inlet to said filter and at the other end to said sump, and means connecting the alternate ones of said passages on the other side of said member which are in communication with the corresponding passages in the first mentioned side of said member to said outlet of said filter.

8. A filter for liquids comprising, in combination, an inlet to said filter and outlet therefrom, a filtering element comprising a member having a plurality of elongated passages formed in one side thereof and a plurality of further elongated passages formed in the other side thereof, said passages on opposite sides of said member being aligned axially and corresponding alterate ones of said passages on the two sides of said member being in communication with one another, a partition wall between each pair of passages on the two sides of said member, each of said partition walls being penetrated by at least one narrow opening elongated in the same direction as said passages and constituting a filtering space establishing communication between the passages on the same side of said member, said filtering spaces being of different gauge on the two sides of said member so as to constitute a two stage filter, means connecting one end of the alternate ones of said passages on one side of said member which are not in communication with the corresponding passages on the other side of said member with said inlet to said filter, the other ends of the same alternate ones of said passages being open, means connecting the alternate ones of said passages on the other side of said member which are in communication with the corresponding passages in the first mentioned side of said member to said outlet of said filter, and a pair of dirt collecting sumps, one arranged in communication with the open end of said alternate passages in the first mentioned side of said member which are connected at the other end to said filter inlet and the other arranged in communication with the alternate passages in the second mentioned side of said member which are in communication with the passages in said first mentioned side of said member.

9. A filter for liquids which comprises in combination a cylindrical sleeve arranged with its axis vertical in the normal position of the filter and having two series of adjacently disposed grooves formed in the axial direction thereof, one series on the inner cylindrical surface and the other on the outer cylindrical surface of the said sleeve, a partition wall between each pair of adjacent grooves in each series, a cylindrical casing and a cylindrical core applied respectively to the outside of the sleeve and to the inside thereof to close the inner and outer series of grooves in the lateral direction thereof, the respective partition walls of the sleeve between adjacent grooves being separated from said cylindrical casing and said core intermediately of the ends of the sleeve by a distance such as to form elongated filtering spaces constituting connecting passages between adjacent grooves in the respective series, an inlet for the liquid leading to the upper ends of one set of alternate grooves of a first of the series, the bottom ends of which set of alternate grooves are open, passages extending through the sleeve and serving to establish communication between the upper ends which are otherwise closed of the other set of alternate grooves of the said first series and the upper ends of one set of alternate grooves of the second series, the bottom ends of which set are open, an outlet for the liquid from the other set of alternate grooves of the second series and a pair of dirt collecting sumps disposed one within the other and arranged to each collect dirt from the lower open ends of one of the sets of alternate groves of the two series thereof.

10. A filter as claimed in claim 9, wherein the partition walls in respect of the two series of grooves are spaced respectively from the cylindrical casing and the cylindrical core by different distances, to form two series of filtering spaces of different gauge to constitute a two stage filter.

11. A filter as claimed in claim 9, in combination with a head element provided with inlet and outlet connections for the filter, two annular recesses formed in said head, and passages establishing communication between said inlet and one of said recesses and between said outlet and the other said recess, that recess connected with the inlet connection being arranged in communication with the upper inlet ends of the one set of alternate grooves of the first series whilst the other recess is arranged in communication with the upper ends of the second set of alternate grooves of the second series and the lower ends of which set of grooves are closed.

12. A filter as claimed in claim 9, in combination with a head element provided with inlet and outlet connections for the filter, two annular recesses formed in said head, passages establishing communication between said inlet and one of said recesses and between said outlet and the other said recess, that recess connected with inlet connection being arranged in communication with the upper inlet ends of the one set of alternate grooves of the first series whilst the other recess is arranged in communication with the upper ends of the second set of alternate grooves of the second series, and the lower ends of which set of grooves are closed and a bolt extending axially of the filter and serving to connect the head to the dirt collecting sump and to clamp the casing, sleeve and core between them.

13. A filter as claimed in claim 9, wherein the grooves in the cylindrical sleeve extend the full length thereof and the open or closed condition of the ends of said grooves is determined by rings provided on the ends of the said sleeve and in which notches are formed in alignment with the ends of those grooves which are to be open, the rings otherwise sealing the ends of the grooves which are to be closed.

STANLEY HERBERT ATTWOOD.